United States Patent Office 3,468,923
Patented Sept. 23, 1969

3,468,923
α,β-UNSATURATED ISOCYANATES
Karl-Heinz Koenig and Horst Pommer, Ludwigshafen (Rhine), Germany, assignors to Badische Anilin- & Soda-Fabrik Aktiengesellschaft, Ludwigshafen (Rhine), Rhineland, Pfalz, Germany
No Drawing. Filed May 23, 1962, Ser. No. 196,912
Claims priority, application Germany, May 26, 1961, B 62,642
Int. Cl. C07c 119/04
U.S. Cl. 260—453       2 Claims This invention relates to a process for the production of α,β-unsaturated isocyanates and carbamyl halides from starting materials which have not hitherto been used for the purpose.

It is known that vinyl isocyanate can be prepared by thermal decomposition of acrylic azide which is obtainable from acrylyl chloride and sodium azide. This process has not acquired any industrial importance, as acrylyl chloride is not readily accessible and the handling of acrylic azide is dangerous.

It is an object of the present invention to provide a process by which α,β-unsaturated aliphatic isocyanates and carbamyl halides can be prepared from readily accessible starting materials which can be handled with facility and without hazard. Another object of the invention is to provide a process by which the said reaction products are obtained in good yields. Further objects and advantages of the invention will become apparent from the following detailed description of our invention.

In accordance with the invention the said objects and advantages are achieved by elimination of hydrogen halide from compounds of the general formula RX at a temperature between 0° and 400° C.

Throughout this specification, hydrogen halide is intended to mean hydrogen chloride and hydrogen bromide, the term halogen means chlorine and bromine, and the term carbamyl halide includes carbamyl chloride and carbamyl bromide. Dehydrohalogenation thus means elimination of hydrogen chloride or hydrogen bromide.

In the process according to the invention, hydrogen halide is split off from the radical R, which is a hydrocarbon radical with 2 to 10 carbon atoms attached to X by way of an aliphatic carbon atom and substituted by bromine and/or chlorine. At both the carbon atom in α-position to X and at least one aliphatic carbon atom in β-position to X which is linked to the carbon atom in α-position by a single bond, the said hydrocarbon radical bears at least one hydrogen atom and/or at least one chlorine atom and/or at least one bromine atom in such a way that one of the said carbon atoms is substituted by at least one hydrogen atom, while the other is substituted by at least one chlorine or bromine atom. This structure assures that by elimination of hydrogen halide an olefinic double bond can be formed in α,β-position to X.

In the above formula RX, X denotes —NCO or NR'COY. In the latter group, Y stands for bromine or chlorine, while R' has the same meaning as R, but may also denote hydrogen or the group CR"$_3$, in which R" represents hydrogen, chlorine or bromine. R and R' may together form a five- to seven-membered heterocyclic ring comprising the nitrogen atom of X and possibly another nitrogen atom or an oxygen atom and being substituted in the said manner by chlorine and/or bromine, so that by elimination of hydrogen chloride or hydrogen bromide an olefinic double bond can be formed in α,β-position to the amide nitrogen atom. The said ring advantageously contains 1 to 6 chlorine and/or bromine atoms.

There are thus three classes of suitable starting materials: Isocyanates derived from primary halogenated amines, carbamylhalides derived from the same type of amines, and carbamyl halides derived from secondary halogenated amines.

The process according to the invention is advantageously carried out by heating the initial materials to 80° to 400° C., especially 100° to 350° C.

It was surprising to find that halogenated isocyanates and carbamyl halides of the formula RX can be converted into the corresponding α,β-unsaturated compounds by thermal dehydrohalogenation, since it is known that vinylisocyanate readily undergoes polymerization at room temperature and polymerization can only be prevented by storing over Dry Ice (cf. thesis by G. Welzel, Freiburg, 1960, p. 14). It was therefore to be expected that under the relatively drastic conditions of dehydrohalogenation the unsaturated isocyanates would be substantially polymerized. It was further surprising to find that the starting compounds of our process can be subjected to the drastic conditions of thermal dehydrohalogenation, as it is known from J. Am. Soc. 58 (1936), p. 2608, that β-chloroethylisocyanate is an unstable compound which splits off carbon dioxide even when standing at room temperature. An especially surprising discovery was that dehydrohalogenation is very successful in the presence of catalysts containing metal salts, since it is known that isocyanates tend to undergo di-, tri- or polymerization when heated with metal salts (Houben-Weyl, Methoden der organischen Chemie, vol. 8, p. 137, para. 1).

Halogenated aliphatic carbamyl halides can for example be prepared from alkanolamines, hydrogen halide and phosgene:

$$CH_2OH—CH_2NH_2 \xrightarrow{+HCl}$$

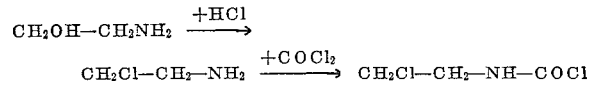

In an analogous manner, N,N-(bis-β-chloroethyl) carbamyl chloride is obtained from diethanolamine, hydrogen chloride and phosgene:

$$\begin{array}{c} HOCH_2—CH_2 \\ \phantom{HOCH_2—}\diagdown \\ \phantom{HOCH_2—CH}NH \\ \phantom{HOCH_2—}\diagup \\ HOCH_2—CH_2 \end{array} \xrightarrow{+2HCl}$$

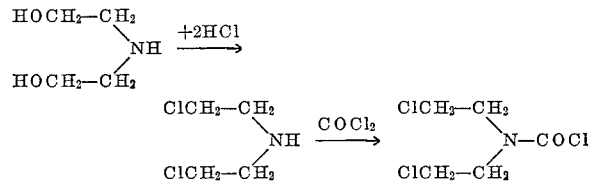

From β-chloroethyl carbamyl chloride, β-chloroethyl isocyanate can be prepared in conventional manner by eliminating hydrogen chloride from the NHCOCl group.

Another possibility of preparing starting materials of the formula RX consists in halogenating aliphatic or heterocyclic carbamyl halides or aliphatic isocyanates. The aliphatic isocyanates or carbamyl chloride may contain hydrocarbon radicals or be partly halogenated. For example, halogenated aliphatic carbamyl halides or isocyanates prepared as described above, i.e., from alkanolamines, may be further halogenated by reaction with chlorine or bromine or with other conventional halogenating agents such as sulfuryl chloride or sulfuryl bromide. The halogenation may be carried out in the presence of free radical forming agents or with the use of ultraviolet light. Suitable free radical forming substances include dibenzoyl peroxide and azoisobutyronitrile. The temperature at which the halogenation is carried out is advantageously 10° to 200° C. It is also possible to work in the presence of halogen transferrers, such is iron(III) chloride or antimony pentachloride, halogenation then being advantageously effected at a temperature of 10° to 110° C. In the halogenation of aliphatic isocyanates or carbamyl halides, mixtures of isocyanates and carbamyl halides are usually formed which sometimes contain components of a different degree of halogenation. The mixtures may be dehydrohalogenated according to the invention directly or hydrogen halide may be split off from the individual components. The former process is to be recommended, as the separation of unsaturated isocyanates and carbamyl halides of a different degree of halogenation is usually more successful than that of saturated compounds containing one more chlorine and one more hydrogen atom.

It will be understood that halogenated heterocyclic carbamyl halides can be prepared in an analogous manner by halogenating carbamyl halides derived from cyclic imines with 5 to 7 ring members.

Suitable starting materials include:

2-chloroethyl isocyanate,
1,2-dichloroethyl isocyanate,
2,2-dichloroethyl isocyanate,
1,1,2- or 1,2,2-trichloroethyl isocyanate,
2-chloropropyl isocyanate,
2,2-dibromopropyl isocyanate,
1,2,2-trichloropropyl isocyanate,
2-chlorooctyl isocyanate,
2-chloroisopropyl isocyanate,
tetradecachlorooctyl isocyanate,
1-phenyl-1-chloroethyl isocyanate,
α-bromoisopropyl isocyanate,
α-chloroisopropyl isocyanate,
pentachloroisopropyl isocyanate, the corresponding carbamyl halides, and also N,N-bis-(2-chloroethyl) carbamyl chloride,
N,N-bis-(2-chloropropyl) carbamyl chloride,
N-chloromethyl-N-trichloroethyl carbamyl chloride,
N-methyl-N-α-chloroethyl carbamyl chloride,
N,N-bis-(2-bromoethyl) carbamyl bromide,
N-bromoethyl-N-α-bromoethyl carbamyl bromide,
N,N-bis-(1,1,2-trichloroethyl) carbamyl chloride,
N,N-bis-(1,2,2-trichloroethyl) carbamyl chloride,
N,N-bis-(1,1,2-trichloropropyl) carbamyl chloride,
N,N-bis-(2-chloro-1,2-dibromoethyl) carbamyl chloride,
N,N-bis-(2-chloro-1,1-dibromoethyl) carbamyl chloride,
N,N-bis-(α-chloroisopropyl) carbamyl chloride,
α-chloromorpholyl carbamyl chloride,
α,α'-dichloromorpholyl carbamyl chloride,
α,α,β,β-tetrachlorocarbamyl chloride,
α-bromopyrrolidylcarbamyl chloride,
α,α'-dichloropiperidylcarbamyl chloride, and
α-chloropiperazyldicarbamyl dichloride.

Preferred starting materials of the formula RX are isocyanates or carbamyl halides in which R is an alkyl radical containing 2 to 4 carbon atoms and being substituted by 1 to 8, especially 1 to 6, chlorine or bromine atoms and R' has the same meaning as R and may also stand for hydorgen or the radical CR"$_3$ in which R" denotes hydrogen, chlorine or bromine.

Another group of preferred starting materials contains as the substituent R an alkyl radical which bears 2 to 4 carbon atoms and is substituted by an aryl radical with 6 to 8 carbon atoms and by 1 to 7, especially 1 to 5 chlorine or bromine atoms. For the purposes of the present invention such radicals are regarded as aliphatic radicals, since they are connected to the nitrogen atom of the isocyanate or carbamyl halide group by way of an aliphatic carbon atom. Obviously, the radicals R in the two preferred groups of substances must be substituted so that a double bond can form in α,β-position to X by elimination of hydrogen halide as explained above. R' in the second group of preferred substances has the same meaning as R, but may, like in the first group, also denote hydrogen or the radical CR"$_3$, in which R" is hydrogen, chlorine or bromine.

The process according to the invention may be carried out at a temperature between 0 and 400° C. The most favorable reaction temperature depends on the one hand on the starting material and on the other hand on whether or not a substance is coemployed which promotes the elimination of hydrogen halide. As regards the influence of the structure of the starting material the general rule holds that the temperature at which the elimination of hydrogen halide proceeds smoothly lies the lower within the tempertature range specified the higher the degree of halogenation of the starting material. If the halogen content per carbon atom of the radical R is 1.5 atoms or higher, the elimination of hydrogen halide generally proceeds smoothly. For example, trichloroethyl isocyanate readily splits off hydrogen chloride at a temperature as low as 125° to 145° C., while dichloroethyl isocyanate can be advantageously dehydrohalogenated at between 150° and 320° C., preferably between 180° and 240° C. 2-chloroethyl isocyanate is conveniently converted into vinyl isocyanate at a temperature between 180° and 400° C., preferably between 210° and 320° C. If mixtures of isocyanates and carbamyl halides of a different degree of halogenation are to be dehydrohalogenated, it is necessary to apply the reaction temperature required by the component that splits off hydrogen halide the least readily. The other components, which by themselves could be reacted at a lower temperature, and their dehydrohalogenation products are thermally stable and are not affected by this treatment.

Other structural features also influence the readiness to split off hydrogen halide. For example, hydrogen halide is split off from halogenated isocyanates or carbamyl halides especially easily, when the carbon atom connected to the halogen atom to be split off bears an aryl radical.

The reaction is preferably carried out in the presence of a largely-surfaced substance. Such substances promote the elimination of hydrogen halide and make possible a lower reaction temperature. The chemical nature of the large-surfaced substances is insignificant, although they must not undergo any chemical change under the reaction conditions. Suitable activators include active carbon, pumice, silica gel, bleaching clays, asbestos, clay, for example china clay, and aluminum hydrosilicates. The preferred large-surfaced substance is active carbon. In many cases especially good results are achieved by using large-surfaced substances incorporating a halide, preferably a chloride or bromide, of an alkali or alkaline earth metal or of aluminum iron(III) chloride or an oxide of tin, thorium or aluminum in an amount of 3 to 30% by weight based on the large-surfaced substance.

The hydrogen halide may be split off from the radical R of the initial materials RX either in the liquid phase or in the gas phase. When working in the liquid phase the halogenated isocyanate or carbamyl halide is heated with stirring, if desired together with a suspended catalyst, until the elimination of hydrogen halide is complete. In the case of large charges it is recommendable to add the halogenated isocyanate or carbamyl halide to the reaction mixture in portions, the elimination of hydrogen halide resulting in a certain tendency to foaming.

In the gas phase, the hydrogen halide may be split off, for example, by passing the vapors of the halogenated isocyanate or carbamyl halide over a rigidly arranged heated catalyst, either from the top or from the bottom. In some cases it is advantageous to pass the vapors of the halogenated isocyanate or carbamyl halide over the catalyst with a stream of inert gas such as nitrogen. The average residence period at the catalyst is 1 to 15 seconds. The vaporous reaction product is condensed and may be purified by distillation.

As a rule, a mixture of isocyanates and carbamyl halides is obtained in the dehydrohalogenation, as carbamyl halides of primary amines readily split off hydrogen halide and are converted into the corresponding isocyanates, and the isocyanates readily add on hydrogen halide to form carbamyl halides. The mixture can be substantially converted into the isocyanate by single or repeated distillation, preferably at atmospheric pressure. α,β-unsaturated carbamyl halide is obtained exclusively by treating the mixture of α,β-unsaturated isocyanate and α,β-unsaturated carbamyl halide with hydrogen halide, for example by introducing hydrogen halide into a solution of the mixture in a hydrocarbon or chlorohydrocarbon, such as cyclohexane, n-heptane, chloroform, ethylene chloride or chlorobenzene.

Dehydrohalogenation of a mixture of isocyanates and carbamyl halides of a different degree of halogenation is more complicated. In this case, carbamyl halides and isocyanates are obtained in the condensation of the reaction mixture side by side, and they differ in the degree of halogenation.

The mixture of isocyanates of different degree of halogenation can be recovered therefrom by distillation, preferably at atmospheric pressure. When pure isocyanates are to be produced, the mixtures may be separated into the individual unsaturated isocyanates of different degree of halogenation by distillation, and the isocyanates may be converted into the unsaturated carbamyl halides by reaction with hydrogen halide.

The unsaturated isocyanates obtainable by the new process are valuable intermediates for further reactions. They may, for example, be used as components in the production of copolymers.

An especially interesting class of new α,β-unsaturated aliphatic isocyanates and carbamyl halides are those substances $R_1X_1$, in which $R_1$ is an alkenyl radical with 2 to 4 carbon atoms substituted by 1 to 7, especially 1 to 5, chlorine or bromine atoms, the olefinic double bond being in α,β-position to $X_1$. $X_1$ in this preferred class of compounds denotes —NCO or NHCOY, Y representing either chlorine or bromine. Compounds of this type include: 1-chlorovinyl isocyanate-(1), 2-bromovinyl isocyanate-(1), 2-chloro-2-bromovinyl isocyanate-(1), 1,2,2-trichlorovinyl isocyanate - (1), 1 - chlorovinylcarbamyl-(1) chloride, 2-bromovinylcarbamyl-(1) bromide, 1-chloropropen-(1)yl isocyanate-(2), 1,1,3,3-tetrachloropropen-(1)-yl isocyanate-(2), and 2,3,3-trichlorobuten-(1)-yl isocyanate-(1).

In another especially valuable class of new α,β-unsaturated aliphatic isocyanates and carbamyl halides of the general formula $R_1X_1$, $R_1$ is an alkenyl radical with 2 to 4 carbon atoms, whose olefinic double bond is a α,β-position to $X_1$ and which is substituted by an aryl radical with 6 to 8 carbon atoms and by up to 6, especially up to 4, chlorine or bromine atoms, and $X_1$ is —NCO or the group NHCOY, in which Y stands for chlorine or bromine. Compounds of this type include 1-phenylvinyl isocyanate-(1), 1-phenylvinylcarbamyl-(1), chloride, 1-phenylvinylcarbamyl-(1) bromide, 1-p-tolylvinyl isocyanate-(1), 1-o,p-dimethylphenyl isocyanate-(1), 1-p-bromophenylvinyl isocyanate-(1), 1-o,p-dichlorophenylvinyl isocyanate-(1), 1-phenyl-2-chlorovinyl isocyanate-(1), 1-phenyl-2,2-dichlorovinyl isocyanate-(1), 1-p-tolylbuten-(1)-yl isocyanate-(1), 2-phenylpropen-(1)-yl isocyanate-(1), 2-phenyl-1,1,3,3-tetrachloropropen-(1)-yl isocyanate-(2), 2-p-chlorophenyl-1-chlorobuten-(1)-yl isocyanate-(1).

The new α,β-unsaturated aliphatic isocyanates and carbamyl halides lend themselves to the production of copolymers. For example, 1-phenylvinyl isocyanate may be copolymerized with methyl acrylate in amounts of 5 to 25% by weight using cyclohexane as the solvent and 0.5% by weight, based on the mixture of monomers, of α,α'-azo-bis-isobutyronitrile as the catalyst at a temperature of 60° to 70° C. The solution of the copolymer is allowed to cool and then mixed with the calculated amount of a conventional cross-linking agent, such as a diol or a diamine. The solution obtained is intended for early use and is suitable for paper coating, for example for the production of water-impermeable paper for packaging purposes. The other new α,β-unsaturated aliphatic isocyanates and carbamyl halides may be used in an analogous manner.

The new unsaturated carbamyl halides are furthermore suitable as pesticides.

The invention is illustrated by, but not limited to, the following examples, in which parts and percentages are by weight.

Example 1

246 parts 2-chloroethyl isocyanate containing 0.25 part benzoyl peroxide is heated to 75° to 85° C. and then 380 parts sulfuryl chloride is added in portions. The sulfuryl chloride is substantially prevented from being entrained by the escaping sulfur dioxide and hydrogen chloride by means of an efficient reflux condenser. After 6 to 8 hours, the trichloroethyl isocyanate is distilled off under reduced pressure. There is obtained 342 parts, i.e., 94% of the theoretical, B.P. 66° C. (85 mm. Hg), refractive index $n_D^{22}=1.4887$. The product contains only about 10% trichloroethylcarbamyl chloride.

342 parts trichloroethyl isocyanate (obtained by chlorination of 2-chloroethyl isocyanate; probably 1,1,2-trichloroethyl isocyanate) is slowly heated to 130° to 138° C. in an agitated vessel with an addition of 10 parts granulated active carbon impregnated with 15% calcium chloride. The dichlorovinyl isocyanate formed is distilled off through a column. The yield of dichlorovinyl isocyanate is 258 parts, i.e., 93.6% of the theory based on trichloroethyl isocyanate, B.P. 123° to 124° C. (760 mm. Hg), refractive index $n_D^{20}=1.5017$.

Example 2

In a vertical, electrically heated reaction tube a catalyst layer is provided which consists of activated carbon with 25% barium chloride of 5 mm. grain size. Above the catalyst zone there is a vaporization zone packed with ceramic material. The vaporization zone is heated to 160° to 180° C. 490 parts liquid dichloroethyl isocyanate (obtained by chlorinating 2-chloroethyl isocyanate; probably 1,2-dichloroethyl isocyanate) is slowly introduced into the vaporization zone while simultaneously feeding a weak current of nitrogen to the upper part of the tube. The temperature in the catalyst zone is at first 200° to 230° C. and rises by about 10° to 25° C. during the hydrogen chloride elimination. The vapors leaving the reaction zone are condensed. By distillation of the condensate, 313 parts 1-chlorovinyl isocyanate of the boiling point 98° C. (760 mm. Hg), refractive index $n_D^{20}=1.4732$ is obtained. The yield is 86.5% of the theoretical.

Example 3

Following the procedure described in Example 2, a mixture of α-chloroisopropyl isocyanate and α-chloroisopropylcarbamyl chloride prepared by chlorination of isopropyl cyanate and having a boiling point of 143° C. (760 mm. Hg) is reacted at a temperature of 220° to 240° C. The mixture of initial material is vaporized in an evaporator and supplied to the catalyst zone by means of a current of nitrogen. The catalyst consists of granulated active carbon containing 10% calcium chloride and 15% barium. The gaseous reaction mixture leaving the reaction zone is cooled. From the condensate, which contains considerable amounts of unreacted starting material, the isopropenyl isocyanate is distilled off together with isopropenyl carbamyl chloride. The mixture has a boiling point of 90° to 91° C. (760 mm. Hg). The pure isopropenyl isocyanate is obtained by distillation over calcium chloride. Pure isopropenylcarbamyl chloride can be obtained by introducing hydrogen chloride into a solution of the mixture in benzene and vaporizing the solvent. Unreacted starting material is returned to the process.

Similar results are obtained by working at 260° to 280° C. and using as the catalyst silica gel incorporating 12% sodium chloride or 5% aluminum chloride.

Example 4

In the manner described in Example 3, α-bromoisopropyl isocyanate, obtained by bromination of isopropyl isocyanate with bromine at room temperature, B.P. 105° (17 mm. Hg), is reacted at a temperature of 200° C. in the presence of granulated active carbon containing 10% calcium chloride. A mixture of isopropenyl isocyanate and isopropenylcarbamyl bromide, B.P. 109° to 112° C. (760 mm. Hg), is obtained. The mixture can be converted into pure isopropenyl isocyanate by repeated distillation. By introducing hydrogen chloride into a solution of the latter in cyclohexane, isopropenylcarbamyl chloride is obtained, while isopropenylcarbamyl bromide can be prepared by introducing hydrogen bromide. Isopropenylcarbamyl bromide can also be prepared by introducing hydrogen bromide into a solution of the said mixture of isocyanate and carbamyl bromide.

A similar yield is obtained by carrying out the re-action at 250° C. and using as the catalyst a bleaching clay containing 4% iron(III) chloride.

Example 5

1-phenyl-1-chloroethyl isocyanate-(1) is prepared by chlorinating 1-phenylethyl isocyanate-(1) with elemental chlorine at 50° C. in the presence of a small amount of dibenzoyl peroxide. The product is vaporized and passed in a current of nitrogen through a catalyst zone charged with active carbon which has been granulated, thoroughly dried and heated to 280° C. and which contains 5% barium chloride. The escaping vapors are cooled and the condensate is rectified, the carbamyl chloride contained in the mixture being substantially converted into isocyanate. After distilling twice or three times, a 1-phenyl-vinyl isocyanate-(1) is obtained which contains approximately 2% of the corresponding carbamyl chloride. It boils at 89° to 90° C. (16 to 18 mm. Hg).

A similar result is obtained by working at 330° C. and using as the dehydrohalogenating agent, asbestos containing 7% tin dioxide and 5% aluminum oxide.

Example 6

342 parts trichloroethyl isocyanate prepared as described in Example 1 is heated to 150° to 165° C. in the liquid phase without adding a dehydrohalogenating agent. The elimination of hydrogen halide proceeds considerably more slowly than in Example 1. After 18 hours the reaction mixture is fractionated through an efficient packed column. The product is dichlorovinyl isocyanate, B.P. 121.5° to 123° C. (763 mm. Hg), which contains approximately 10% of the corresponding carbamyl chloride.

Example 7

257 parts pentachloroisopropyl isocyanate (probably 1,1,2,3,3-pentachloropropyl isocyanate-(2); obtained by chlorinating isopropyl isocyanate with elemental chlorine in the absence of a solvent at a temperature increased from room temperature to 120° to 130° C.) is heated for 6 hours at 145° to 175° C. with an addition of 35 parts pumice. The mixture is distilled through a packed column under reduced pressure. Tetrachloroisopropenyl isocyanate (1,1,3,3 - tetrachloropropen-(1)-yl isocyanate-(2)), B.P. 96.5° C. to 98° C. (24 mm. Hg) is obtained in a yield of 83%.

Example 8

204 parts N,N - bis-(α-chloroethyl)-carbamyl chloride is reacted in the gas phase as described in Example 2 in the presence of a catalyst of active carbon heated to 290° C. The vaporous reaction mixture is cooled. From the condensate, N,N-divinylcarbamyl chloride, B.P. 65° to 66.5° C. (37 mm. Hg), is obtained by careful fractionation through a packed column. The unreacted starting material remaining as the distillation residue is returned to the process. The yield is 68 to 73% of the theoretical.

Example 9

A mixture of tri- and tetrachloromorpholylcarbamyl chloride (B.P. 106° C. (91 mm. Hg); refractive index $n_D^{20}=1.5415$) obtained by chlorination of morpholylcarbamyl chloride with elemental chlorine is heated for 3 hours at 145° to 155° C. with an addition of granulated active carbon. When the elimination of hydrogen chloride is practically complete, the reaction mixture is distilled through a column. A mixture of chlorinated morpholylcarbamyl chlorides is obtained that are unsaturated in α,β-position to the carbamyl group. The reaction product boils at 122° to 132° C. (18 mm. Hg) and the yield is 72% of the theoretical.

We claim:

1. An α,β-unsaturated isocyanate of the formula $$R_1-N=C=O$$

wherein $R_1$ represents alkenyl of 2 to 4 carbon atoms substituted by 1 to 7 halogen atoms selected from the class consisting of chlorine and bromine, the olefinic double bond being in α,β-position with reference to the nitrogen atom.

2. An α,β-unsaturated isocyanate of the formula $$R_2-N=C=O$$

wherein $R_2$ represents alkenyl of 2 to 4 carbon atoms, the olefinic bond being in α,β-position with reference to the nitrogen atom, said alkenyl being substituted in one of said α- and β-positions by aryl of 6 to 8 carbon atoms, resulting arylalkenyl group being substituted by up to 6 halogen atoms selected from the group consisting of chlorine and bromine.

References Cited

UNITED STATES PATENTS

| | | | |
|---|---|---|---|
| 2,245,547 | 6/1941 | Pollack | 260—486 |
| 2,334,476 | 11/1943 | Coffman | 260—453 |
| 2,694,726 | 11/1954 | Anspon | 260—247.2 XR |
| 2,706,733 | 4/1955 | Reid | 260—453 |
| 3,041,364 | 6/1962 | McShane et al. | 260—453 |

FOREIGN PATENTS

| | | |
|---|---|---|
| 1,278,456 | 1/1961 | France. |

OTHER REFERENCES

Groggins: Unit Processes 1958, pp. 247–250.

ALBERT T. MEYERS, Primary Examiner

D. R. MAHANAND, Assistant Examiner

U.S. Cl. X.R.

106—2; 117—135.5, 155; 260—77.5, 86.1, 247.2, 268, 294, 326.8, 544, 999